US009932895B2

(12) United States Patent
Rice et al.

(10) Patent No.: US 9,932,895 B2
(45) Date of Patent: Apr. 3, 2018

(54) RADIAL PASSAGE ENGINE WASH MANIFOLD

(71) Applicant: EcoServices, LLC, Wethersfield, CT (US)

(72) Inventors: Robert M. Rice, Huntsville, AL (US); Wayne J. Zadrick, Bristol, CT (US); Sebastian Nordlund, Sundbyberg (SE); Kurt D. Dorshimer, Fayetteville, GA (US)

(73) Assignee: EcoServices, LLC, Wethersfield, CT (US)

( * ) Notice: Subject to any disclaimer, the term of this patent is extended or adjusted under 35 U.S.C. 154(b) by 145 days.

(21) Appl. No.: 14/511,741

(22) Filed: Oct. 10, 2014

(65) Prior Publication Data
US 2015/0101641 A1   Apr. 16, 2015

Related U.S. Application Data

(60) Provisional application No. 61/889,373, filed on Oct. 10, 2013.

(51) Int. Cl.
| | |
|---|---|
| *B08B 3/00* | (2006.01) |
| *B08B 3/02* | (2006.01) |
| *B08B 3/12* | (2006.01) |
| *B08B 9/00* | (2006.01) |
| *B08B 9/02* | (2006.01) |
| *F02B 77/04* | (2006.01) |
| *F01D 25/00* | (2006.01) |
| *B64F 5/30* | (2017.01) |

(52) U.S. Cl.
CPC ............... *F02B 77/04* (2013.01); *B64F 5/30* (2017.01); *F01D 25/002* (2013.01); *B08B 3/02* (2013.01); *F02B 2077/045* (2013.01)

(58) Field of Classification Search
None
See application file for complete search history.

(56) References Cited

U.S. PATENT DOCUMENTS

| 1,834,534 A | 12/1931 | Richards et al. |
|---|---|---|
| 1,890,156 A | 12/1932 | Konig |
| 1,926,924 A | 9/1933 | Sylvan |

(Continued)

FOREIGN PATENT DOCUMENTS

| CH | 699129 | * 1/2010 | ............ A47J 47/20 |
|---|---|---|---|
| CN | 1705524 A | 12/2005 | |

(Continued)

OTHER PUBLICATIONS

CH699129 English translation (abstract), accessed on Sep. 2016.*

(Continued)

*Primary Examiner* — Eric W Golightly
*Assistant Examiner* — Arlyn I Rivera-Cordero
(74) *Attorney, Agent, or Firm* — Westman, Champlin & Koehler, P.A.

(57) ABSTRACT

An engine wash manifold assembly for delivering wash liquid to an engine with a radial air passage includes a feeder body, an inlet on the feeder body to receive wash fluid, a first nozzle in fluid communication with the feeder body and configured to direct wash fluid into the radial passage, and a securing device configured to support the feeder body relative to a mounting location.

21 Claims, 13 Drawing Sheets

(56) References Cited

U.S. PATENT DOCUMENTS

| | | |
|---|---|---|
| 2,760,597 A | 8/1956 | Brixius |
| 2,878,892 A | 3/1959 | Field |
| 3,439,372 A | 4/1969 | Collier |
| 3,527,030 A | 9/1970 | Hungate |
| 3,564,820 A | 2/1971 | Nelson |
| 3,616,623 A | 11/1971 | Reid |
| 3,623,668 A * | 11/1971 | Freid .................... F01D 25/002 134/22.18 |
| 3,766,719 A | 10/1973 | McAnally, III |
| 3,897,263 A | 7/1975 | Davis et al. |
| 3,938,972 A | 2/1976 | Sugimura |
| 4,059,123 A | 11/1977 | Bartos et al. |
| 4,065,322 A | 12/1977 | Langford |
| 4,158,449 A | 6/1979 | Sun et al. |
| 4,185,802 A | 1/1980 | Fischer et al. |
| 4,196,020 A | 4/1980 | Hornak et al. |
| 4,225,188 A | 9/1980 | McGuire et al. |
| 4,234,323 A | 11/1980 | Maher |
| 4,300,918 A | 11/1981 | Cary |
| 4,462,192 A | 7/1984 | Fisher |
| 4,530,707 A | 7/1985 | Ovard |
| 4,543,108 A | 9/1985 | Wurz |
| 4,595,419 A | 6/1986 | Patenaude |
| 4,713,120 A | 12/1987 | Hodgens, II et al. |
| H000535 H | 10/1988 | Sam et al. |
| 4,802,901 A | 2/1989 | Wurz et al. |
| 4,834,912 A | 5/1989 | Hodgens, II et al. |
| 4,975,101 A | 12/1990 | Swanborn |
| 5,011,540 A | 4/1991 | McDermott |
| 5,018,355 A | 5/1991 | Foster |
| 5,022,614 A | 6/1991 | Rinderer |
| 5,137,555 A | 8/1992 | Fewel, Jr. |
| 5,141,186 A | 8/1992 | Cusic |
| 5,268,011 A | 12/1993 | Wurz |
| 5,269,823 A | 12/1993 | Wurz |
| 5,273,395 A | 12/1993 | McDermott |
| 5,318,254 A | 6/1994 | Shaw et al. |
| 5,385,014 A | 1/1995 | Rathburn |
| 5,454,533 A | 10/1995 | Grant et al. |
| 5,458,299 A | 10/1995 | Collins et al. |
| 5,464,459 A | 11/1995 | VanBuskirk et al. |
| 5,518,553 A | 5/1996 | Moulder |
| 5,725,611 A | 3/1998 | Wright et al. |
| 5,868,860 A | 2/1999 | Asplund |
| 5,893,538 A * | 4/1999 | Onishi .................... H02G 3/263 248/222.52 |
| 5,899,217 A | 5/1999 | Testman, Jr. |
| 5,972,062 A | 10/1999 | Zimmermann |
| 6,017,377 A | 1/2000 | Brown et al. |
| 6,080,225 A | 6/2000 | Forster |
| 6,310,022 B1 | 10/2001 | Amiran |
| 6,394,108 B1 | 5/2002 | Butler |
| 6,470,668 B2 | 10/2002 | Payling et al. |
| 6,478,033 B1 | 11/2002 | Foster |
| 6,484,508 B2 | 11/2002 | Rocklin et al. |
| 6,503,334 B2 | 1/2003 | Ruiz et al. |
| 6,964,699 B1 | 11/2005 | Carns et al. |
| 7,018,965 B2 | 3/2006 | Yan et al. |
| 7,065,955 B2 | 6/2006 | Reback et al. |
| 7,150,431 B2 | 12/2006 | Dennis |
| 7,185,663 B2 | 3/2007 | Koch et al. |
| 7,198,052 B2 | 4/2007 | Watt |
| D548,899 S | 8/2007 | Asplund |
| 7,297,260 B2 | 11/2007 | Hjerpe et al. |
| 7,445,677 B1 * | 11/2008 | Asplund .................... B08B 3/02 134/134 |
| 7,497,220 B2 | 3/2009 | Asplund et al. |
| 7,815,743 B2 | 10/2010 | Asplund et al. |
| 8,066,816 B2 | 11/2011 | Asplund et al. |
| 8,197,609 B2 | 6/2012 | Alvestig et al. |
| 8,206,478 B2 | 6/2012 | Nordlund et al. |
| 8,273,184 B2 | 9/2012 | Wagner |
| 8,273,187 B2 | 9/2012 | Asplund et al. |
| 8,277,647 B2 | 10/2012 | Rice et al. |
| 8,337,630 B2 | 12/2012 | De La Bruere-Terreault et al. |
| 8,479,754 B2 | 7/2013 | Hjerpe |
| 8,524,010 B2 | 9/2013 | Nordlund et al. |
| 8,628,627 B2 | 1/2014 | Sales et al. |
| 8,685,176 B2 | 4/2014 | Wagner |
| 8,747,566 B2 | 6/2014 | Rice et al. |
| 2002/0121289 A1 * | 9/2002 | Brown .................... B08B 3/02 134/6 |
| 2003/0066198 A1 * | 4/2003 | Turner .................... G01C 9/28 33/370 |
| 2003/0209256 A1 | 11/2003 | Tadayon |
| 2005/0199271 A1 | 9/2005 | Watt |
| 2006/0060218 A1 | 3/2006 | Lakadawala et al. |
| 2006/0060233 A1 | 3/2006 | Lakdawala et al. |
| 2006/0219269 A1 | 10/2006 | Rice et al. |
| 2006/0243308 A1 | 11/2006 | Asplund et al. |
| 2007/0000528 A1 | 1/2007 | Asplund et al. |
| 2007/0028947 A1 | 2/2007 | Erickson et al. |
| 2007/0048127 A1 | 3/2007 | O'Neill et al. |
| 2007/0059159 A1 | 3/2007 | Hjerpe |
| 2008/0087301 A1 | 4/2008 | Lee et al. |
| 2008/0149141 A1 | 6/2008 | Sales |
| 2008/0178909 A1 | 7/2008 | Alvestig et al. |
| 2008/0216873 A1 | 9/2008 | Hjerpe et al. |
| 2009/0293254 A1 | 12/2009 | Rice et al. |
| 2010/0031977 A1 | 2/2010 | Sales |
| 2010/0200023 A1 | 8/2010 | Giljohann et al. |
| 2010/0242994 A1 | 9/2010 | Amcoff et al. |
| 2010/0243001 A1 | 9/2010 | Amcoff et al. |
| 2010/0263541 A1 | 10/2010 | Kippel et al. |
| 2011/0186096 A1 | 8/2011 | Nordlund et al. |
| 2011/0232697 A1 | 9/2011 | Amcoff et al. |
| 2012/0279523 A1 | 11/2012 | de la Bruere-Terreault et al. |
| 2013/0240002 A1 | 9/2013 | Hjerpe |
| 2014/0000656 A1 | 1/2014 | Rice et al. |
| 2014/0000717 A1 | 1/2014 | Rice et al. |
| 2014/0020715 A1 | 1/2014 | Nordlund et al. |
| 2014/0034091 A1 | 2/2014 | Dorshimer et al. |
| 2014/0034092 A1 | 2/2014 | Dorshimer et al. |
| 2014/0034130 A1 | 2/2014 | Dorshimer et al. |
| 2014/0060589 A1 | 3/2014 | Nordlund et al. |
| 2014/0083466 A1 | 3/2014 | Sales, Jr. et al. |
| 2014/0216501 A1 | 8/2014 | Rice et al. |
| 2014/0251392 A9 | 9/2014 | Alvestig et al. |
| 2014/0260307 A1 | 9/2014 | Dorshimer et al. |
| 2014/0260308 A1 | 9/2014 | Dorshimer et al. |

FOREIGN PATENT DOCUMENTS

| | | |
|---|---|---|
| CN | 1908383 A | 2/2007 |
| CN | 1976843 A | 6/2007 |
| CN | 101191426 A | 6/2008 |
| CN | 101578143 A | 11/2009 |
| CN | 101865035 A | 10/2010 |
| DE | 2701823 A1 | 8/1977 |
| DE | 9420362 U1 | 5/1995 |
| EP | 0262097 A2 | 3/1988 |
| EP | 418736 A2 | 3/1991 |
| EP | 0628477 A1 | 12/1994 |
| EP | 1205640 A2 | 5/2002 |
| EP | 2286933 A1 | 2/2011 |
| GB | 2074048 A | 10/1981 |
| JP | 52-109769 | 9/1977 |
| JP | 2002242613 A | 8/2002 |
| JP | 2002256889 A | 9/2002 |
| SE | 522306 C2 | 1/2004 |
| SU | 1755965 A1 | 8/1992 |
| WO | 92/14557 A1 | 9/1992 |
| WO | WO96/40453 A1 | 12/1996 |
| WO | 2004/055334 A1 | 7/2004 |
| WO | 2005/028119 A1 | 3/2005 |
| WO | 2005/077554 A1 | 8/2005 |
| WO | WO2005/121509 A1 | 12/2005 |

OTHER PUBLICATIONS

International Search Report and Written Opinion from PCT Application Serial No. PCT/US2014/060026, dated Jul. 24, 2015, 16 pages.

(56) References Cited

OTHER PUBLICATIONS

First Office Action Issued in Corresponding Chinese Patent Application No. 201480055637.9, dated Jan. 17, 2017.
Office Action Issued in Corresponding European Patent Application No. EP14876505 dated Mar. 6, 2017.

\* cited by examiner

RADIAL PASSAGE ENGINE WASH MANIFOLD

CROSS-REFERENCE TO RELATED APPLICATION(S)

This application claims priority to "Radial Passage Engine Wash Manifold," U.S. Provisional Patent Application Ser. No. 61/889,373, filed Oct. 10, 2013, which is hereby incorporated by reference in its entirety.

BACKGROUND

The present invention relates generally to systems and methods for washing engines, and more particularly to systems and methods of washing gas turbine engines having radial passages at or near an engine inlet.

Through use, gas turbine engines become subject to buildup of contaminants on engine components. These contaminants can affect engine components and overall performance of the engine. Engine washing can help to remove these contaminants and improve engine performance and efficiency.

Conventional washing can be done by connecting a manifold to an inlet of the engine, and introducing a fluid to the inlet of the engine. Typically, during a wash, the engine is cranked and the airflow from the fan carries the wash fluid through the various sections of the engine, including the compressor. Thus, the wash fluid removes contaminants as it flows through the engine.

SUMMARY

In one aspect of the present invention, an engine wash manifold assembly for delivering wash liquid to an engine with a radial air passage includes a feeder body, an inlet on the feeder body to receive wash fluid, a first nozzle in fluid communication with the feeder body and configured to direct wash fluid into the radial passage, and a securing device configured to support the feeder body relative to a mounting location.

The present summary is provided only by way of example, and not limitation. Other aspects of the present disclosure will be appreciated in view of the entirety of the present disclosure, including the entire text, claims and accompanying figures.

Figure 1:
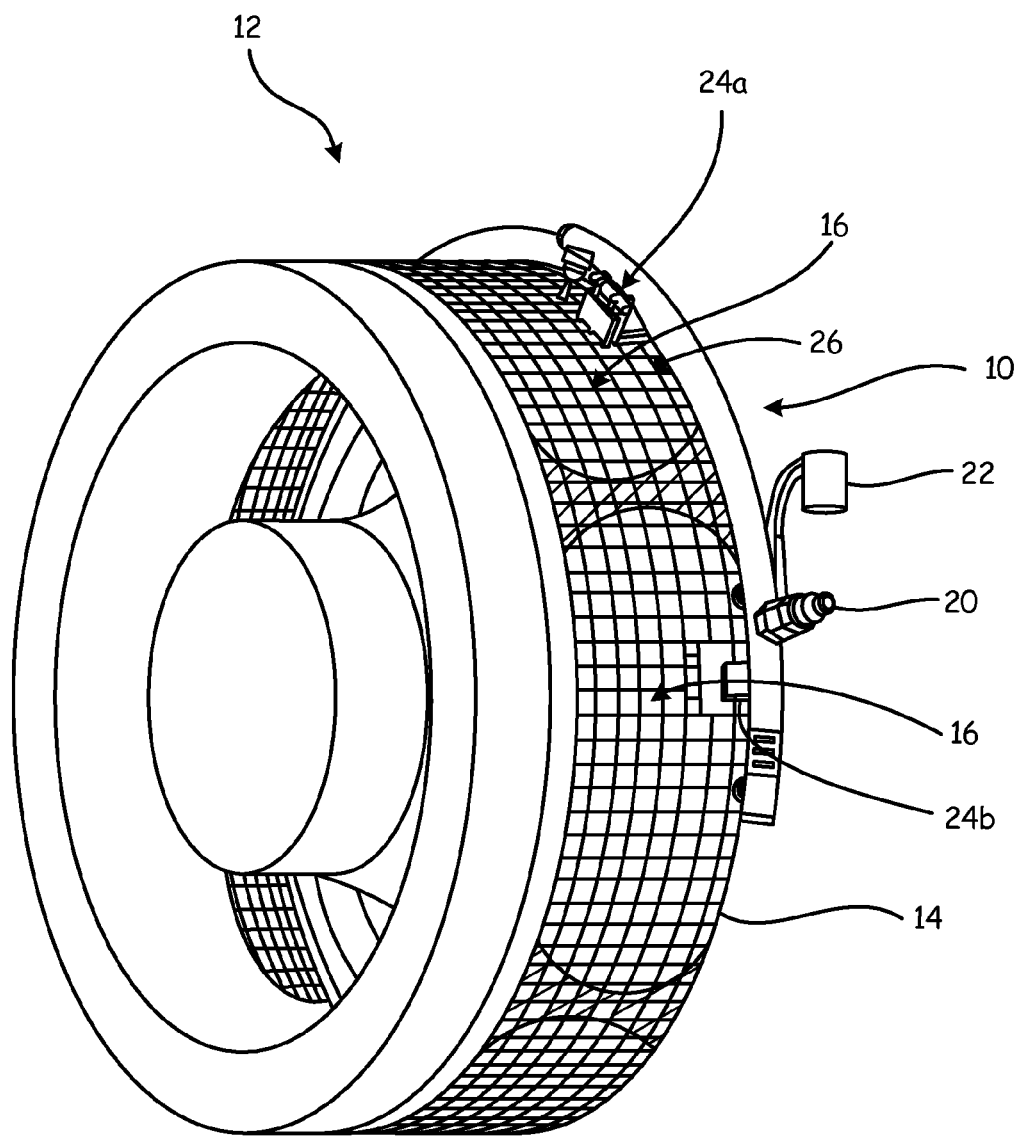
FIG. 1 is a perspective view of an engine wash manifold connected to a portion of an engine.

While the above-identified drawing figures set forth embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Figure 2A:
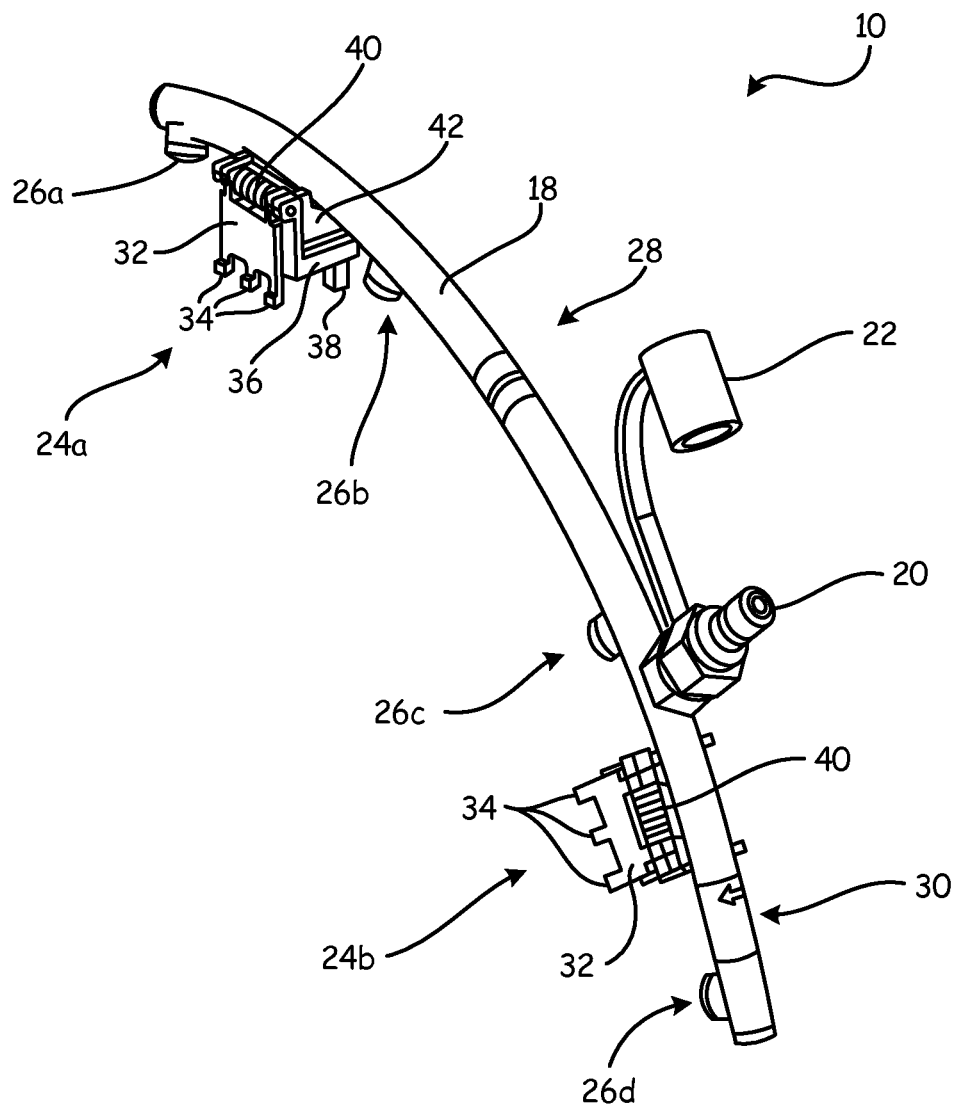
FIG. 2A is a perspective view of the engine wash manifold of FIG. 1 from a forward position, shown in isolation.
Figure 2B:
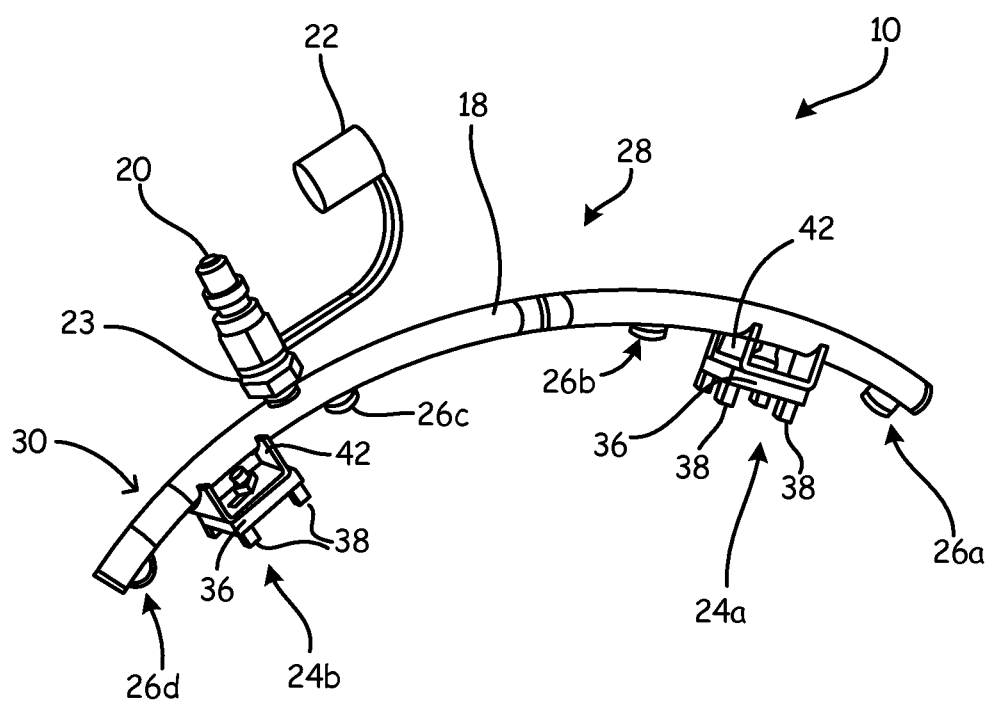
FIG. 2B is a perspective view of the engine wash manifold of FIG. 1 from a back position, shown in isolation.
Figure 2C:
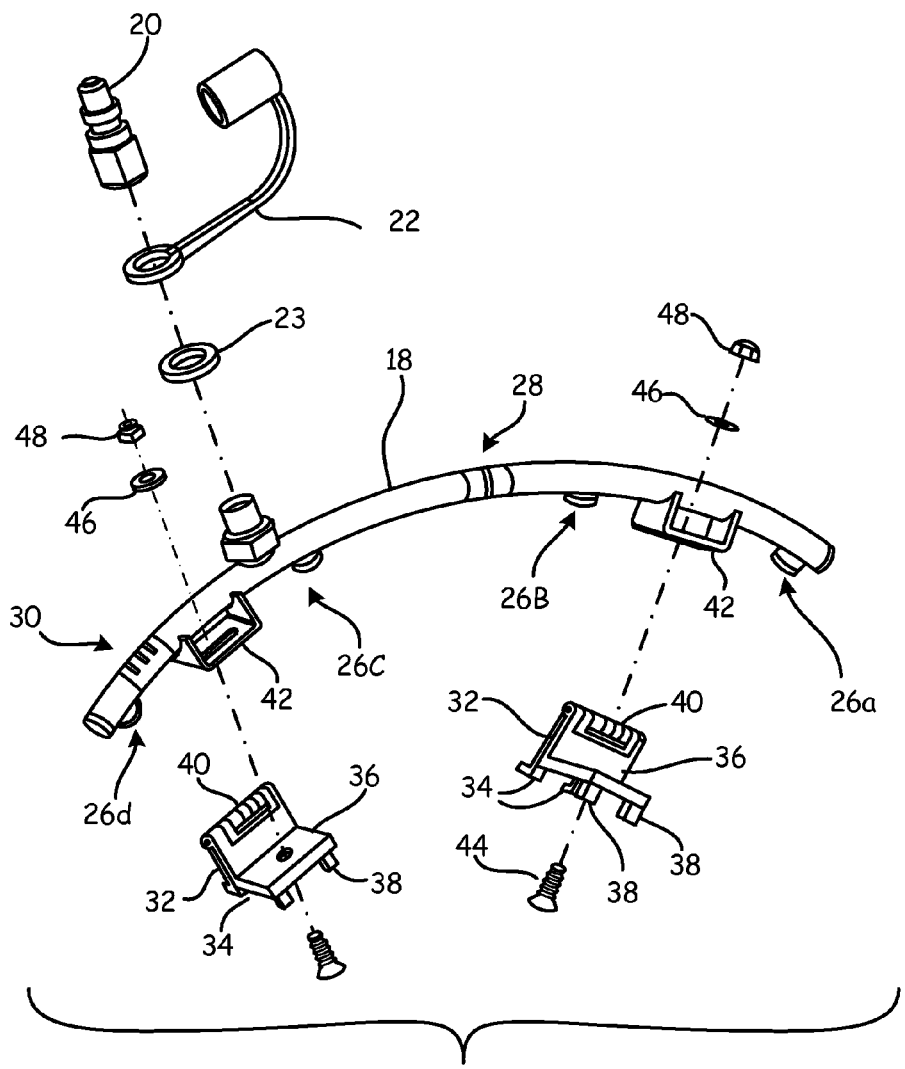
FIG. 2C is an exploded view of the engine wash manifold of FIG. 1, shown in isolation.
Figure 2D:
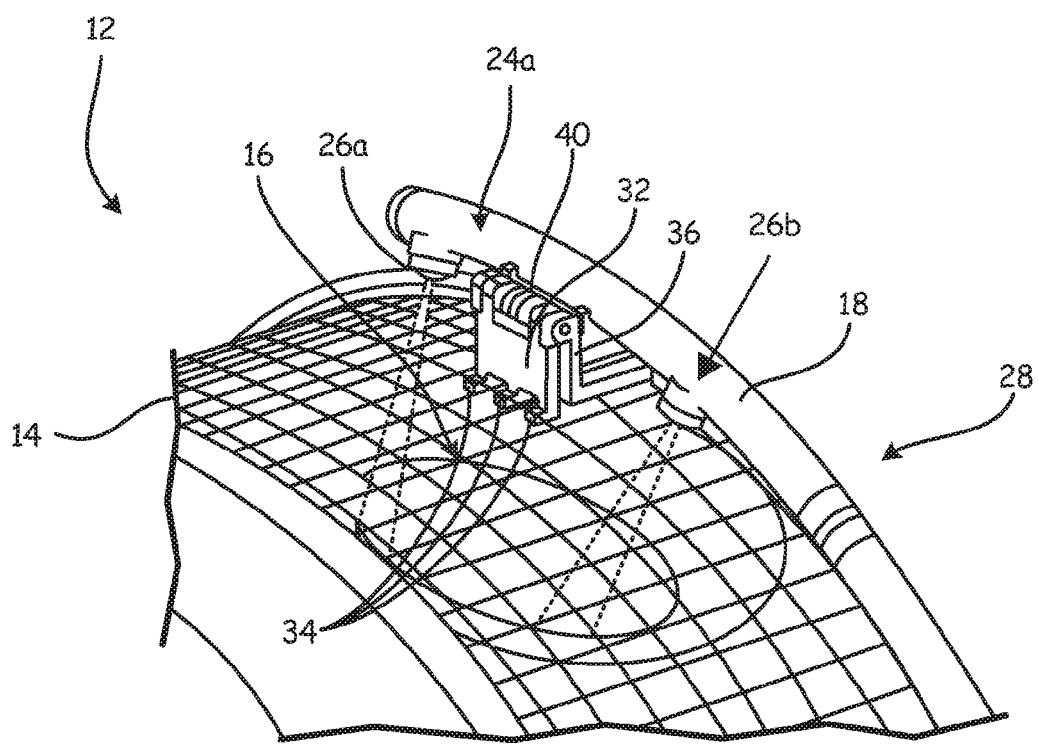
FIG. 2D is an enlarged view a portion of the engine wash manifold and the portion of the engine of FIG. 1.

A first embodiment of the present invention is illustrated with respect to FIGS. 1 to 2D. FIG. 1 is a perspective view of one embodiment of engine wash manifold 10 connected to engine 12 (only a portion of which is illustrated) with inlet screen 14 and inlet passageways ducts 16 that extend in a generally radial direction. In the illustrated embodiment, engine 12 is a turboprop engine, though in further embodiments it should be understood that other types of engine configurations are possible, and the present invention can be applied to gas turbine engines for helicopters, auxiliary power units (APUs), prop fan engines, low and high bypass ratio jet engines, industrial gas turbine power plants, military tanks, ships and the like.

Turboprop engine 12 is illustrated in FIG. 1 as a Propeller Turbine 6 "PT6" engine (available from Pratt & Whitney Canada, Longueuil, Quebec, Canada) and includes a compressor section (not shown) which is located radially inward from inlet screen 14 inside of inlet ducts 16. During operation of engine 12, inlet ducts 16 receive airflow, which is fed to the compressor, and subsequently flows to other parts of the engine. As mentioned above, this airflow can contain contaminants which can remain in the engine and can negatively affect overall engine performance.

Manifold 10 is shaped to hold nozzles securely in place for an engine 12 wash operation, and to provide delivery of wash fluid at relatively high pressures (e.g., 200-1000 psi [1.379-6.895 megapascal] or more). Manifold 10 can be made of metal, such as stainless steel and coated in part or in whole with a polymer type coating to prevent scratching or marring of surfaces when attaching manifold 10 to engine 12. Manifold 10 connects to inlet screen 14 to suitably direct wash fluid into inlet ducts 16 to clean contaminants within compressor and other components of engine 12. The process of delivering a wash fluid is highly complex, and can involve precise positioning of manifold 10 relative to engine 12 to provide, for instance, wash fluid atomization and dispersion and entrainment in intake airflows, in order to help promote effectively delivery of the wash fluid such that, for instance, an entire span of internal engine airfoils are wetted and cleaned. Effective positioning and fluid pressure are particularly important in helping to regulate droplet (or particle) size of the wash fluid, as small dimensions tend to cause the wash fluid to undesirably undergo a phase change and large dimensions cause centrifugal action in engine 12 to more outward without desired dispersion.

Washing liquid is typically atomized prior to entering a compressor of engine 12 for enhanced penetration into the compressor. Once inside the compressor the atomized droplets generally collide with gas path components such as rotor blades and stator vanes. The impingement of the droplets results in surface wetting and, when at least when the wash fluid include a liquid, in establishing of a liquid film. The deposited particles on the gas path components are released by mechanical and/or chemical action of the wash fluid. Wash fluid penetration into the compressor is further enhanced by allowing the rotor shaft to rotate during washing. This can be done by letting the engine's starter motor turn the rotor whereby air is driven through the engine carrying the wash fluid from the compressor inlet towards the outlet. The cleaning effect can be further enhanced by the rotation of the rotor as the wetting of the blades creates a film which will be subject to motion forces such as centrifugal forces during washing.

FIG. 2A shows a perspective view of engine wash manifold 10 from a forward position, FIG. 2B shows a perspective view of engine wash manifold 10 from a back position, FIG. 2C shows an exploded view of engine wash manifold 10, and FIG. 2D shows a close up view of a portion of manifold 10 connected to inlet screen 14 of engine 12.

Manifold 10 includes feeder body 18, inlet 20 with inlet cap 22, seal 23, securing devices 24, nozzles 26*a*, 26*b*, 26*c*, 26*d* (collectively, nozzles 26), centering feature 28, and forward orienting feature 30. In the embodiment shown, securing devices 24 are first and second clamps 24*a*, 24*b* each include first clamping member 32 with tabs 34, second clamping member 36 with tabs 38, spring 40, clamp bracket 42, screw 44, washer 46 and nut 48.

Feeder body 18 is shaped to correspond with at least a portion of inlet screen 14. In the embodiment shown, feeder body 18 is configured as an arcuate pipe and is about 14 inches (0.3556 m) in length with a screen diameter of about 19 inches (0.4826 m). Other embodiments can have different shapes and/or dimensions.

Nozzles 26*a*, 26*b*, 26*c* and 26*d* are positioned on and fluidically connected with feeder body 18 so that they direct wash fluid into engine 12 inlet ducts 16 when manifold 10 is secured relative to engine 12. Nozzles 26*a*, 26*b*, 26*c* and 26*d* can be any type of nozzle desired for the specific engine washing operation. Nozzles 26*a*, 26*b*, 26*c* and 26*c* can atomize wash liquid and can vary to direct water at different pressures, droplet sizes, temperatures and flow rates. Examples of suitable wash liquid delivery parameters, for a water-only wash fluid embodiment, are disclosed in U.S. Pat. No. 5,868,860, which is hereby incorporated by reference in its entirety. Examples of other wash fluid parameters suitable for various embodiments are disclosed in U.S. Pat. Nos. 7,497,220; 8,197,609; 8,479,754 and 8,524,010, which are further incorporated herein by reference.

Inlet 20 can be positioned at any desired position on feeder body 18 to receive wash fluid into feeder body 18. Inlet 20 can be a quick-connect coupling and can include inlet cap 22 for covering inlet when manifold 10 is not in use. Alignment feature 28 can be a sticker or other marking on feeder body 18 to help circumferentially align manifold 10 properly when securing to engine 12. Cleaning efficacy can be enhanced by using alignment feature to position nozzles 20 in desired locations. Similarly, forward orienting feature 30 can be a sticker, painting or other marking to indicate which side of manifold 10 faces axially forward with respect to the engine 12 and inlet screen 14.

First and second clamps 24*a*, 24*b* are shown as spring-loaded clamps which engage engine 12 inlet screen 14 secure manifold to engine 12 radially and axially. First and second clamps 24*a*, 24*b* secure to feeder body 18 with brackets 42, screw 44, washer 46 and nut 48. On each clamp 24*a*, 24*b*, spring 40 biases first clamping member 32 from second clamping member 36. First clamping member 32 includes tabs 34 which extend radially inward from first clamping member as well as axially forward. Second clamping member 36 includes tabs 38 which extend radially inward from second clamping member 36.

As shown in FIG. 1 and FIG. 2D, manifold 10 connects to engine 12 through first and second clamps 24*a*, 24*b* engaging inlet screen 14. To secure manifold 10 to inlet screen 14, centering feature 28 and forward orienting feature 30 can be used to properly align manifold 10 with respect to engine 12 and inlet screen 14. First clamping member 32 can then be squeezed against second clamping member 36, compressing spring 40. Tabs 38 and 34 can then be inserted into holes in inlet screen 14. Once fully inserted, first clamping member 32 can be released, and spring 40 will bias first clamping member forward, away from second clamping member 36. This will cause tabs 34 to extend axially beneath an inlet screen 14 wire (see FIG. 2D). Thus, clamps 24*a*, 24*b* will engage inlet screen 14 through tabs 34 and 38, securing manifold to engine 12 in a radial and axial direction. Once first and second clamps 24*a*, 24*b* engage inlet screen 14, manifold 10 is properly secured so that nozzles 26*a*, 26*b*, 26*c* and 26*d* are properly located for a washing operation. In further embodiments, a thumbscrew (not shown) can be added to first clamping member 32 to help secure clamp 24*a* or 24*b*. Moreover, in further embodiments, the number of tabs 38 and 34 on each clamp 24*a*, 24*b* can vary as desired (e.g., with only one tab 38 and 34 per clamp 24*a*, 24*b*) to make installation easier.

To wash engine 12, manifold 10 is secured to inlet screen 14 in engine 12 as shown in FIG. 1 and FIG. 2D. Once manifold 10 has been positioned with respect to engine 12, an engine washing operation can begin. Inlet 20 can receive wash fluid, such as a homogenous liquid (e.g., heated, deionized water), liquid mixture (e.g., a water and detergent mixture, or water, detergent and an anti-freezing agent), solid particle and gas mixture (e.g., solid $CO_2$ particles entrained in a carrier gas) and the like. The particular wash fluid used can be selected as desired for particular applications, such as depending on system needs and requirements, environmental conditions (e.g., ambient temperature), etc. Wash fluid can be temperature regulated for more efficient washing processes by using a heater (not shown) to increase the temperature, isopropyl alcohol to keep wash liquid from freezing in cold weather or other means depending on system requirements. Wash fluid can be delivered from a hose (not shown) connected to a wash unit (not shown) or from another source.

Wash liquid travels through feeder body 18 to nozzles 26*a*, 26*b*, 26*c* and 26*d*. Nozzles 26*a*, 26*b*, 26*c* and 26*d* direct the wash liquid into inlet ducts 16 to remove contaminants and buildup in engine 12. During a wash operation, engine can be cranked to assist in flowing wash liquid through engine 12 in the same manner that air and contaminants flow through engine 12. For washing operations, it may be desirable to motor engine 12 with a starter or auxiliary power unit (not shown).

As mentioned above, many engines are washed by connecting a manifold to an inlet near the fan and spraying wash fluid into the engine inlet. Due to the architecture of certain engines, like typical turboprop engines, use of prior art manifolds that connect to the engine inlet cowling to axially direct wash fluid are not possible. Thus for cleaning of engines with radial passageways, due to the unique architecture and the use of inlet screen 14, some aircraft have integrated wash components. Integrated components add weight to an associated aircraft and therefore additional fuel expense for a component that is not necessary during flight. Other washing is done by simply using a hose to try to spray into different sections of the engine, but such use of a hose is usually at relatively low pressures and without consistent positioning, which may not provide desired cleaning efficacy. Other washing is also done by using a tube formed to fit the inlet screen, the tube of which contains drilled holes to inject streams of wash fluid inward at relatively low pressures (below 100 psi). This method does not atomize or control droplet size and thus does not provide desired cleaning efficacy. However, the present invention improves upon such other washing.

Manifold 10 can effectively wash turboprop engine 12 by being able to attach quickly, easily and securely to engine 12 inlet screen 14, allowing for the delivery of high-pressure wash fluid through nozzles 26a, 26b, 26c and 26d. The unique design of manifold 10 with feeder body 18 and clamps 24a, 24b allow nozzles 26a, 26b, 26c and 26d to deliver wash liquid into inlet ducts 16 to clean compressor, turbine and other engine 12 components, resulting in improved penetration of the engine core gas path over past engine cleaning systems, particularly for engines having radial passageways at or near an inlet. Feeder body 18 can be specifically shaped and sized to follow the unique curvature of inlet screen 14, and clamps 24a, 24b provide for a secure and quick engagement and release. A manifold which has a quick engagement and release allows for a quicker engine wash, making the aircraft available for use sooner.

By using manifold 10 to effectively washing wash engine 12, engine 12 can have an overall increased performance by decreasing engine temperature, reducing fuel consumption, increasing engine power and improving overall engine efficiency and extending the time until the engine needs to be overhauled. A clean engine 12 can also result in fewer harmful engine 12 emissions by reducing fuel consumption while restoring efficiency, overall performance and increasing life of engine 12.

FIGS. 3A to 9 show alternative embodiments of manifold 10 and securing device 24 for washing engine 12. While many embodiments are shown and described, changes may be made and equivalents may be substituted for elements thereof without departing from the scope of the invention. Moreover, while common elements such as nozzles 26 are described only briefly with respect to each of these alternative embodiments, features and configurations of the nozzles 26 can be similar to those described above with respect to the first embodiment, with such modifications as desired for particular applications. In each of the embodiments shown in FIGS. 3A to 9, manifold 10 can be secured or positioned relative to engine 12 so that one or more nozzles 26 can spray into radial passages (e.g., radial inlet ducts 16) to wash engine 12. Some embodiments include components that touch inlet screen 14, and others do not. Some embodiments are able to extend through a nacelle and others can enter engine 12 from other locations to secure manifold 10 for washing. Due to feeder body 18 and securing devices 24, manifold 10 can quickly and effectively wash engine 12 with radial air inlets 16 and inlet screen 14.

Figure 3A:
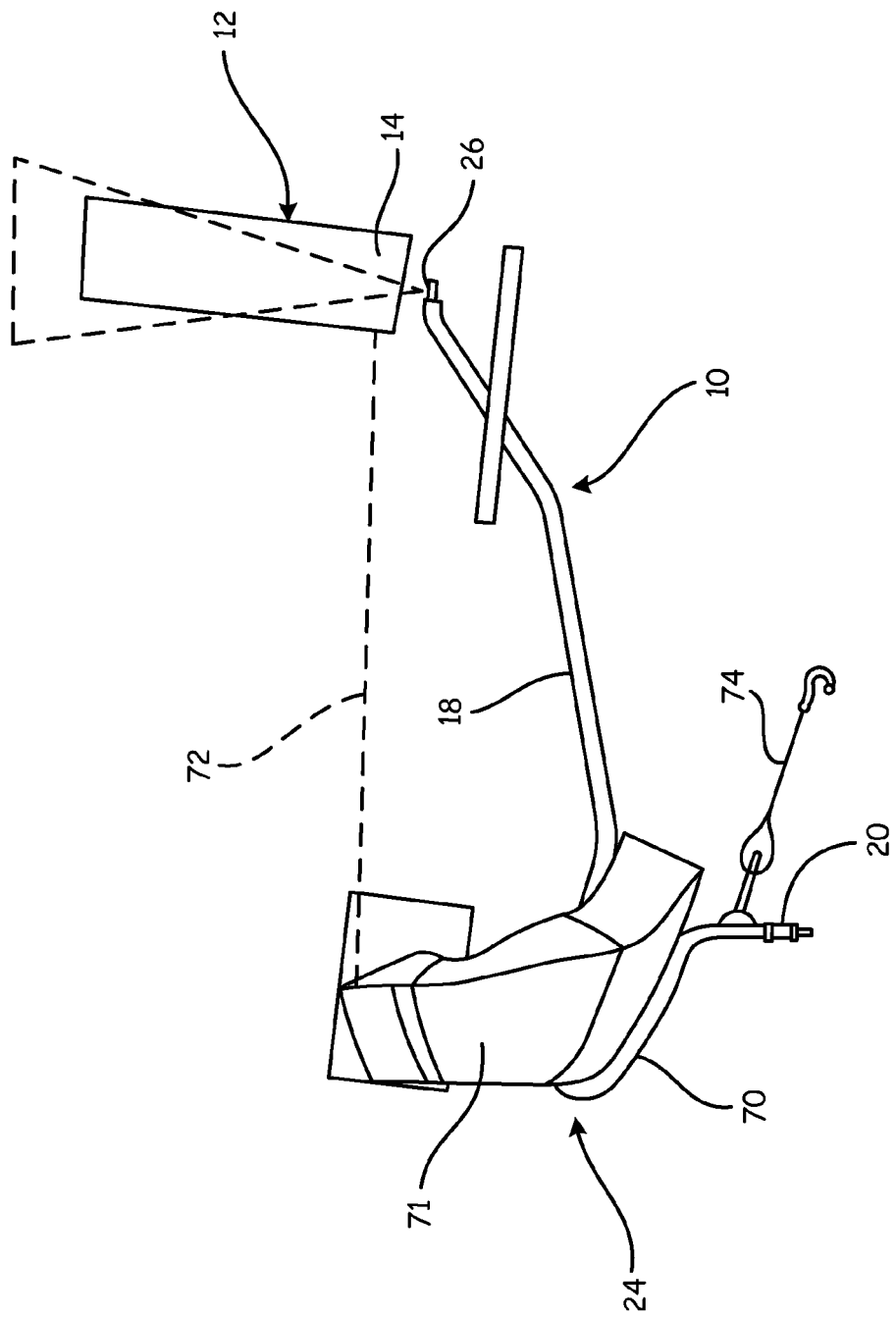
FIG. 3A is a partial side perspective view of another embodiment of an engine wash manifold connected to a portion of an engine assembly.
Figure 3B:
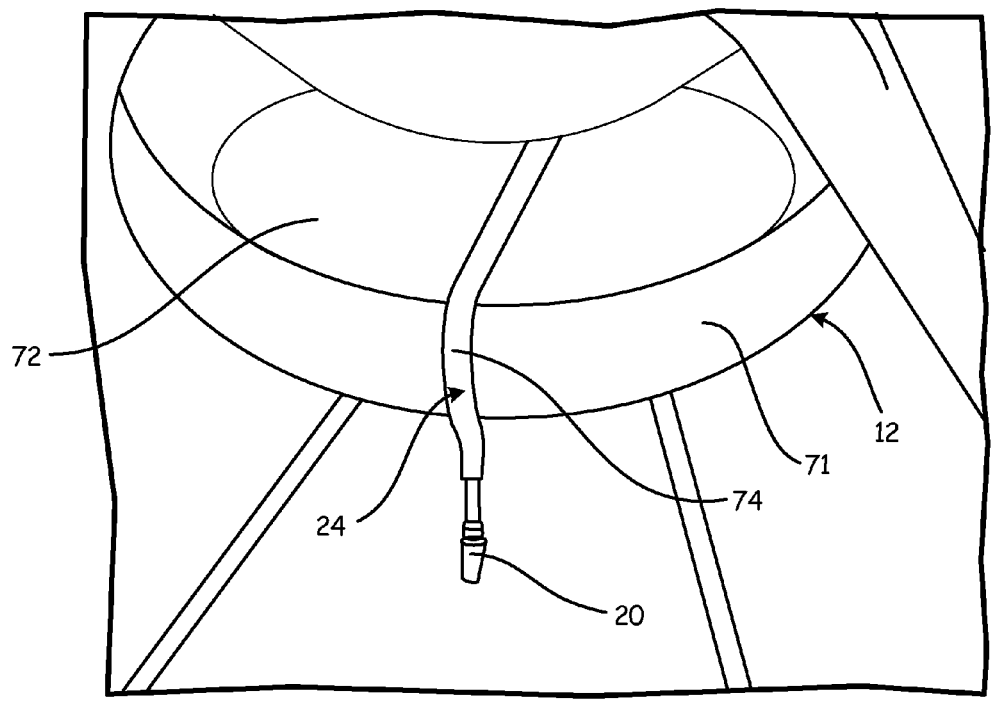
FIG. 3B is a forward perspective view of the embodiment of the engine wash manifold and the engine assembly of FIG. 3A.

FIGS. 3A and 3B illustrate another embodiment of engine wash manifold 10 extending into engine 12 through nacelle 71 and an air duct, with the manifold 10 configured to hold nozzles 26 in position to spray radially into engine 12. In the embodiment shown in FIG. 3, support member 70 is a portion of the feeder body 18 that acts as a securing device. The feeder body 18 enters through nacelle 71 and axial inlet duct 72, and can be held manually and/or secured with hook 74. In the illustrated embodiment, support member 70 is a portion of the feeder body 18 with a hook-like or U-shaped configuration that relatively snugly fits onto nacelle 71 or another suitable structure. Support member can be arranged in between inlet 20 and nozzle 26m in a middle portion of feeder body 18. Portions of feeder body 18 on opposite sides of support member 70 can extend at different angles than support member 70. At least support member 70 can be coated with a polymeric or other relatively soft coating to help reduce a risk of scuffing or damage to nacelle 71, etc. Adjustable hook 74 can secure support member 70 relative to the nacelle 71 or another suitable mounting location. Support member 70 can go between motor mounts to place nozzle 26 under screen 14. Wash fluid travels through support member 70 and feeder body 18 to spray through nozzle 26 radially (e.g., upward) into engine 12. One or more nozzles 26 can be provided, as desired for particular applications.

Figure 4:
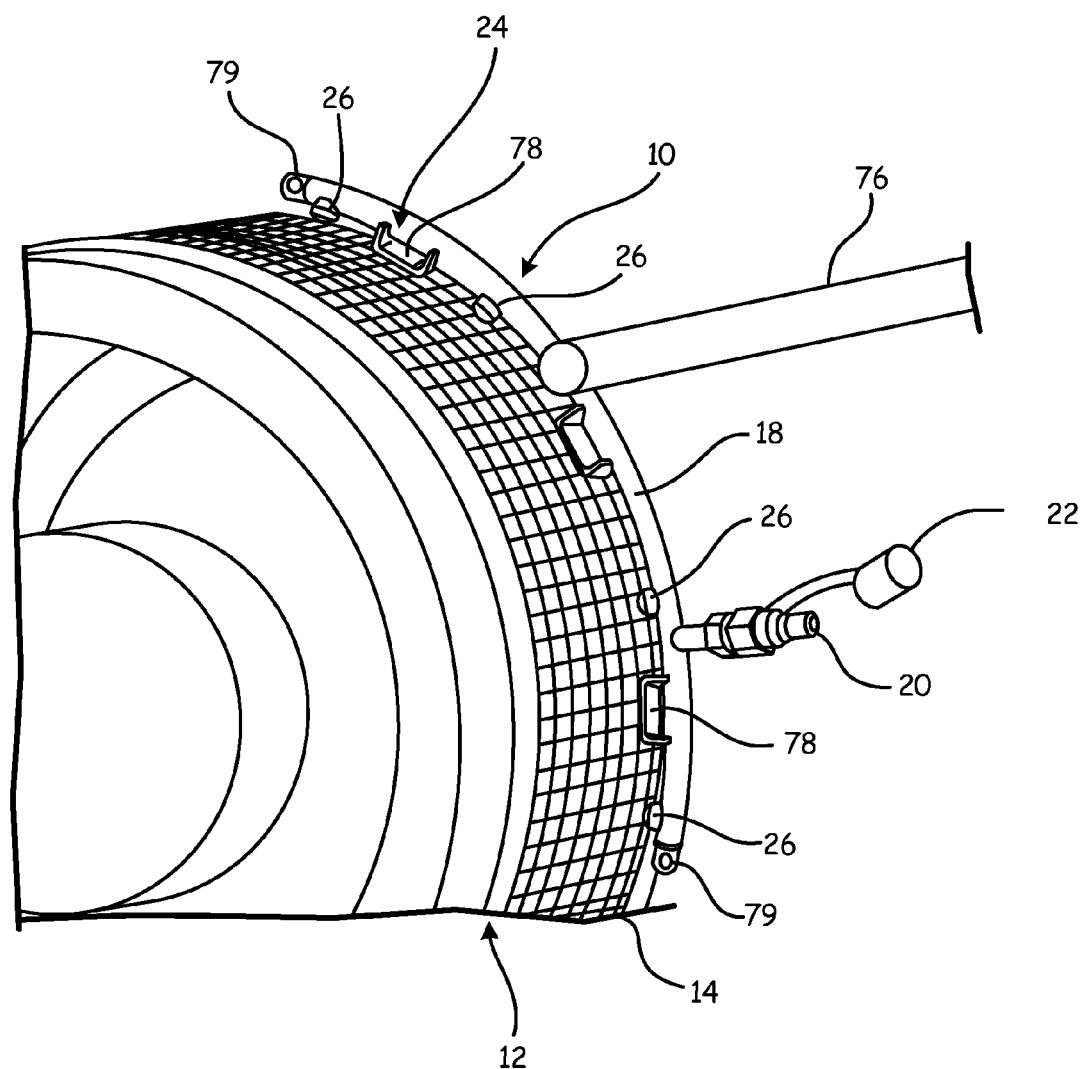
FIG. 4 is a perspective view of another embodiment of an engine wash manifold connected to a portion of an engine.

FIG. 4 shows a third embodiment of engine wash manifold 10, configured to hold nozzles 26 in position to spray radially into engine 12. In this embodiment, manifold 10 includes rest pads 78, which are secured to feeder body 18 and can rest against inlet screen 14 of the engine 12 during use. In the illustrated embodiment, there are two rest pads 78 interspersed among the nozzles 26, which are oriented to provide generally radial fluid flow through the inlet screen 14.

In some embodiments, pipe 76 can optionally by used as a securing device extending into the engine 12, and can be secured with straps, hooks (on a cord), cable ties, or other suitable attachment mechanisms (not shown) that connect to inlet screen 14. Pipe 76 can also be held manually, without any attachment mechanisms, to position or secure manifold 10 with respect to engine 12.

Attachment mechanisms 79 (e.g., eyelets) can be provided at opposite ends of the feeder body 18, and can be used to secure attachment members (e.g., straps and the like), as desired. Further explanation of similar mechanisms is provided below with respect to the discussion of FIG. 9.

Figure 5:
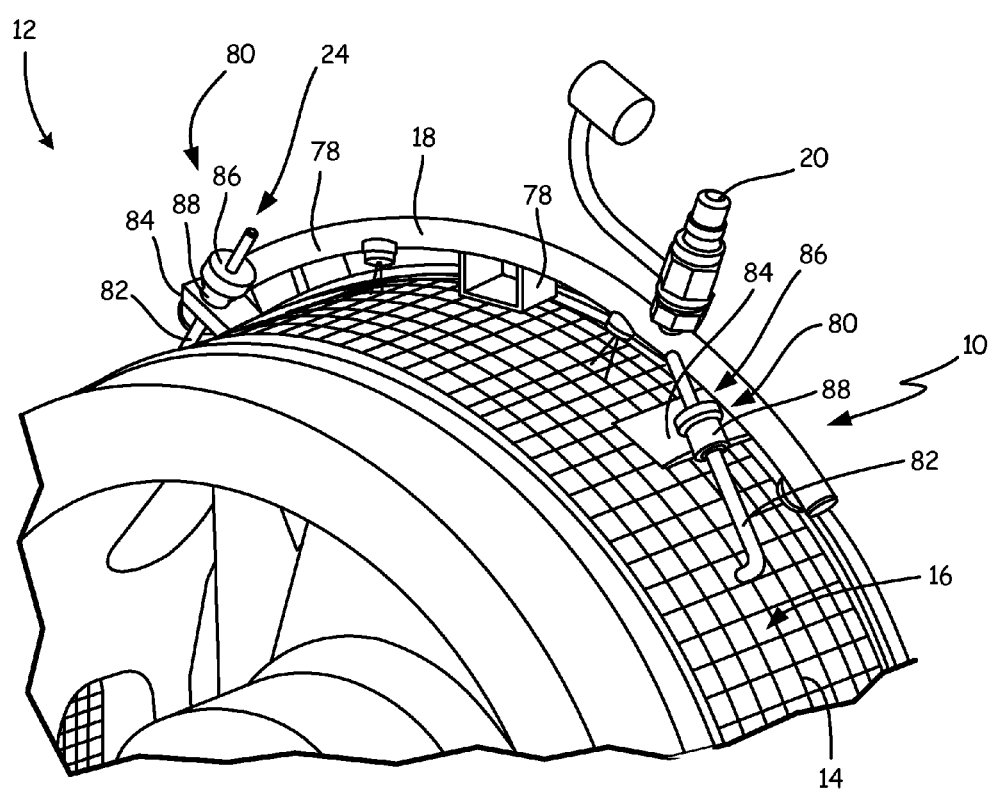
FIG. 5 is a perspective view of another embodiment of an engine wash manifold connected to a portion of an engine.

FIG. 5 shows a fourth embodiment of manifold 10 connected to inlet screen 14, configured to hold nozzles 26 in position to spray radially into engine 12. In this embodiment, securing device include two retention hooks 80. Retention members 80 each include engagement hook 82, bracket 84, knob 86 and nut 88. Engagement member 82 can move with respect to bracket 84, and is positioned through use of knob 86 and nut 88.

Bracket 84 connects directly or indirectly to feeder body 18, and engagement hook 82 is inserted into openings in inlet screen 14. Knob 86 and nut 88 tighten to move engagement hook 82 relative to screen 18 (e.g., in a generally circumferential or tangential direction) to hold engagement member 82 (via a positively-engaged hooking action), securing manifold 10 to inlet screen 14 to inject wash fluid into radial air inlet ducts 16 of engine 12 through nozzles 26. Manifold 10 also includes rest pads 78, which rest against inlet screen 14.

Figure 6:
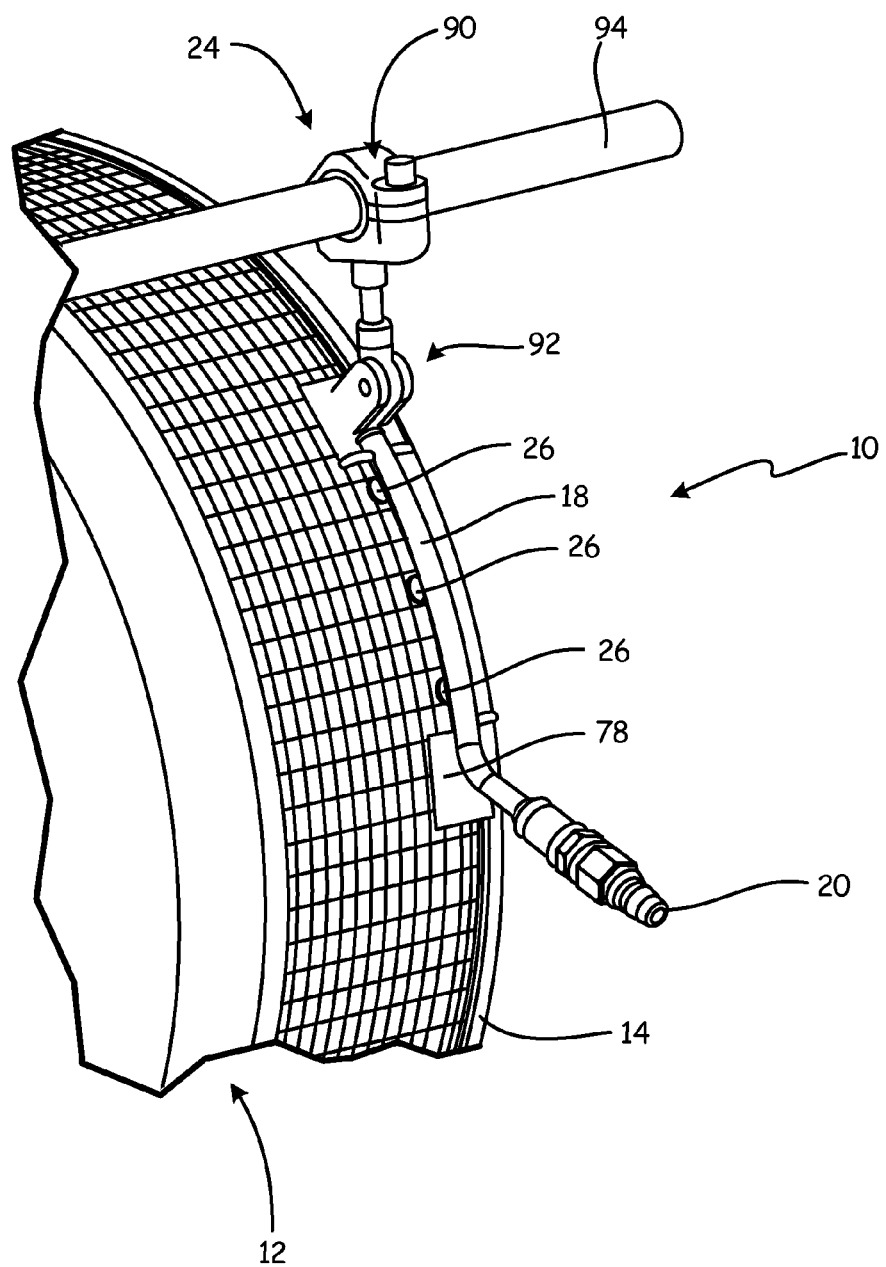
FIG. 6 is a perspective view of another embodiment of an engine wash manifold connected to a portion of an engine.

FIG. 6 shows a fourth embodiment of engine wash manifold 10, configured to hold nozzles 26 in position to spray radially into engine 12. In this embodiment, securing device 24 includes clamping device 90 and bracket 92. Clamping device 90 is secured to tube 94, which can be part of engine 12 that extends generally axially (or can be a separate part, in further embodiments). Clamping device 90 is connected to bracket 92, which is secured to feeder body 18 opposite the clamping device 90. Bracket 92 (and/or clamping device 90) can be configured to provide a pivot or other suitable joint that allows manipulation and repositioning of feeder body 18 relative to screen 14. Bracket 92 and rest pad 78 connect to inlet screen 14 to hold nozzles 26 in position to spray radially into engine 12.

Figure 7:
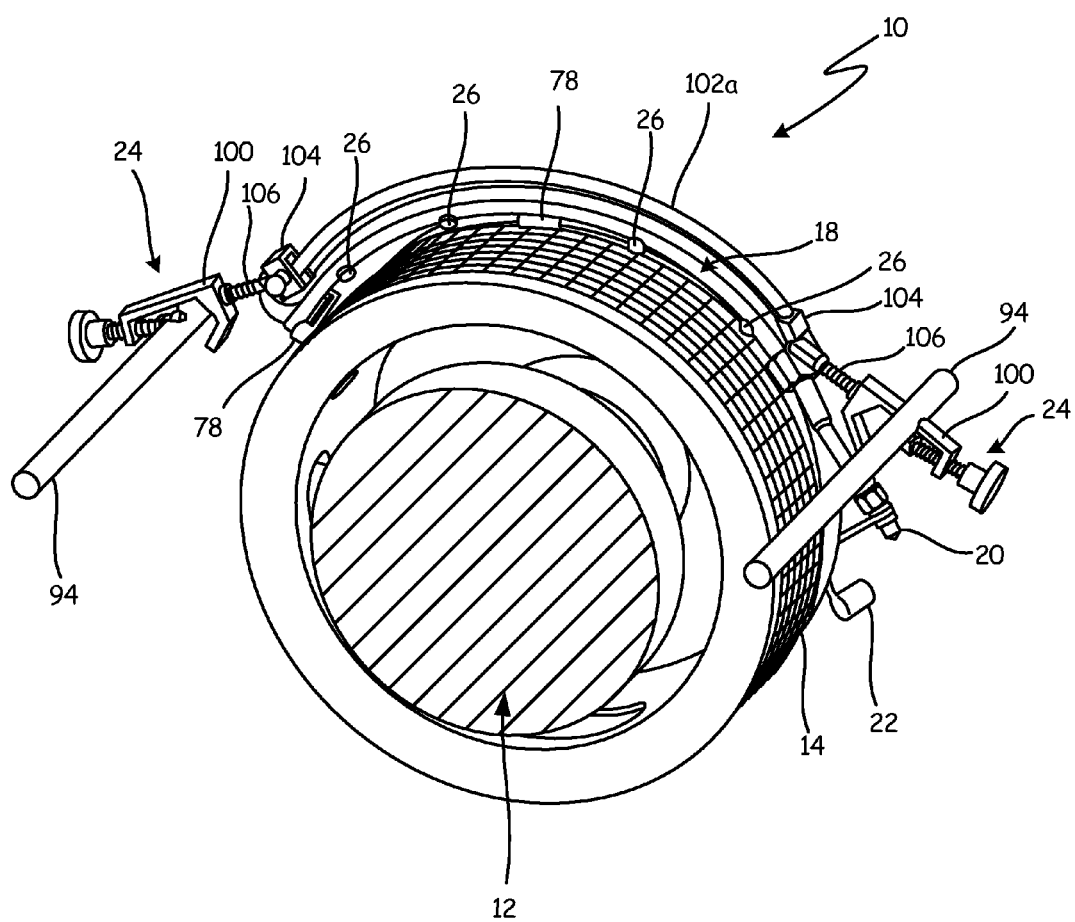
FIG. 7 is a perspective view of another embodiment of an engine wash manifold connected to a portion of an engine.

FIG. 7 shows a fifth embodiment of an engine wash manifold 10, configured to hold nozzles 26 in position to spray radially into engine 12. In this embodiment, securing device 24 includes attachment mechanisms 100, support track 102, adjustable engagement mechanisms 104. Attachment mechanisms 100 can each be secured to a portion of engine 12, such as generally axially extending tubes 94. Rest pads 78 engaged with feeder body 18 can be placed on or near screen 14. Attachment mechanisms 100 can adjustably connect to engagement mechanisms 104, which are repositionably engageable with support track 102, which support feeder body. Support track 102 can provide a track or pathway 102a along which engagement mechanisms 104 can each be selectively secured at desired locations. In the illustrated embodiment, track 102a is arcuate in shape. Because an operable length of link 106 between attachment mechanisms 100 and engagement mechanisms 104 is adjustable, and because the engagement mechanisms 104 can be secured at different locations along track 102a, manifold 10 can be installed in a variety of engines in which locations and spacing of tubes 94 varies.

Figure 8:
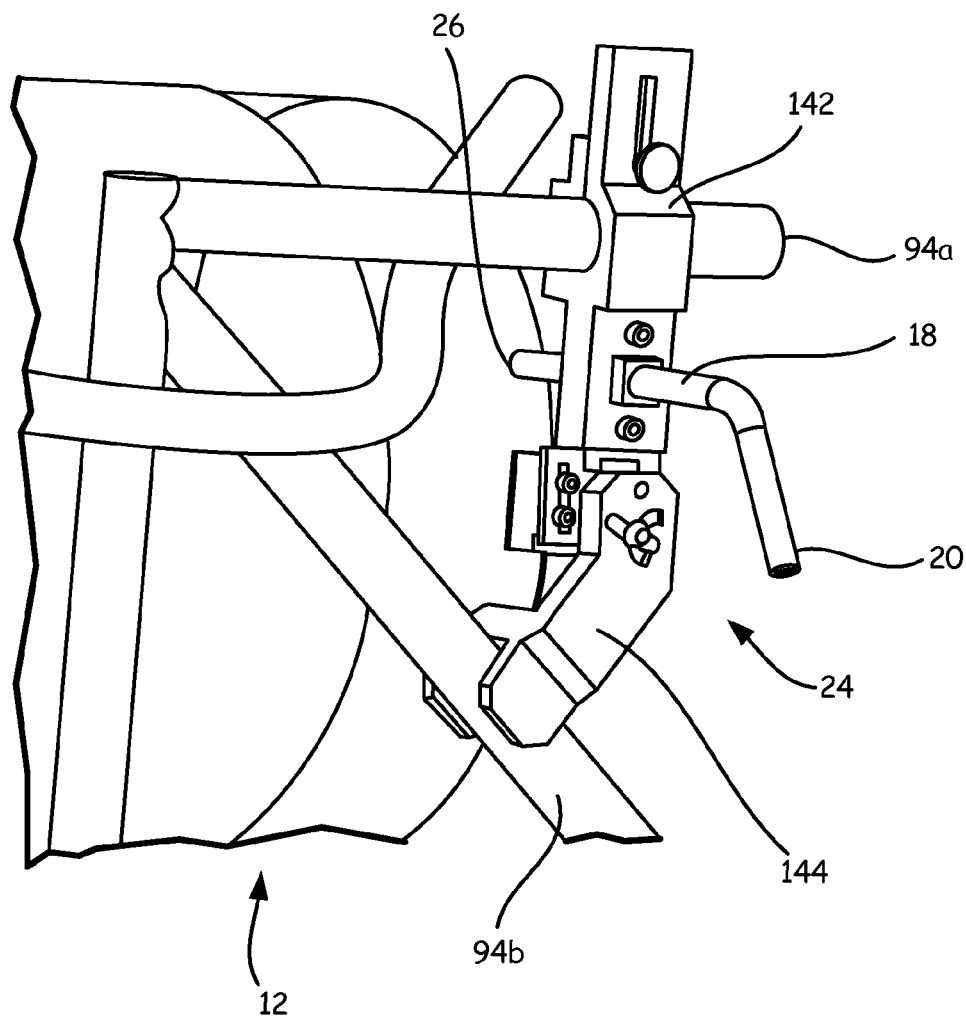
FIG. 8 is a perspective view of another embodiment of an engine wash manifold connected to a portion of an engine.

FIG. 8 shows a sixth embodiment of an engine wash manifold 10, configured to hold nozzles 26 in position to spray radially into engine 12. Manifold 10 can includes a single orifice and hose 140 attached to securing device 24, which includes bracket 142 and adjustable leg 144. Bracket 142 clamps to structural tubing 94. A quick coupling (not shown) can be provided for attaching to an inlet 20 at an end of hose 140 (e.g., at the bent end as shown in FIG. 8). The embodiment of FIG. 8 may be useful for aircraft and engines for which access to a radial inlet screen is limited.

Figure 9:
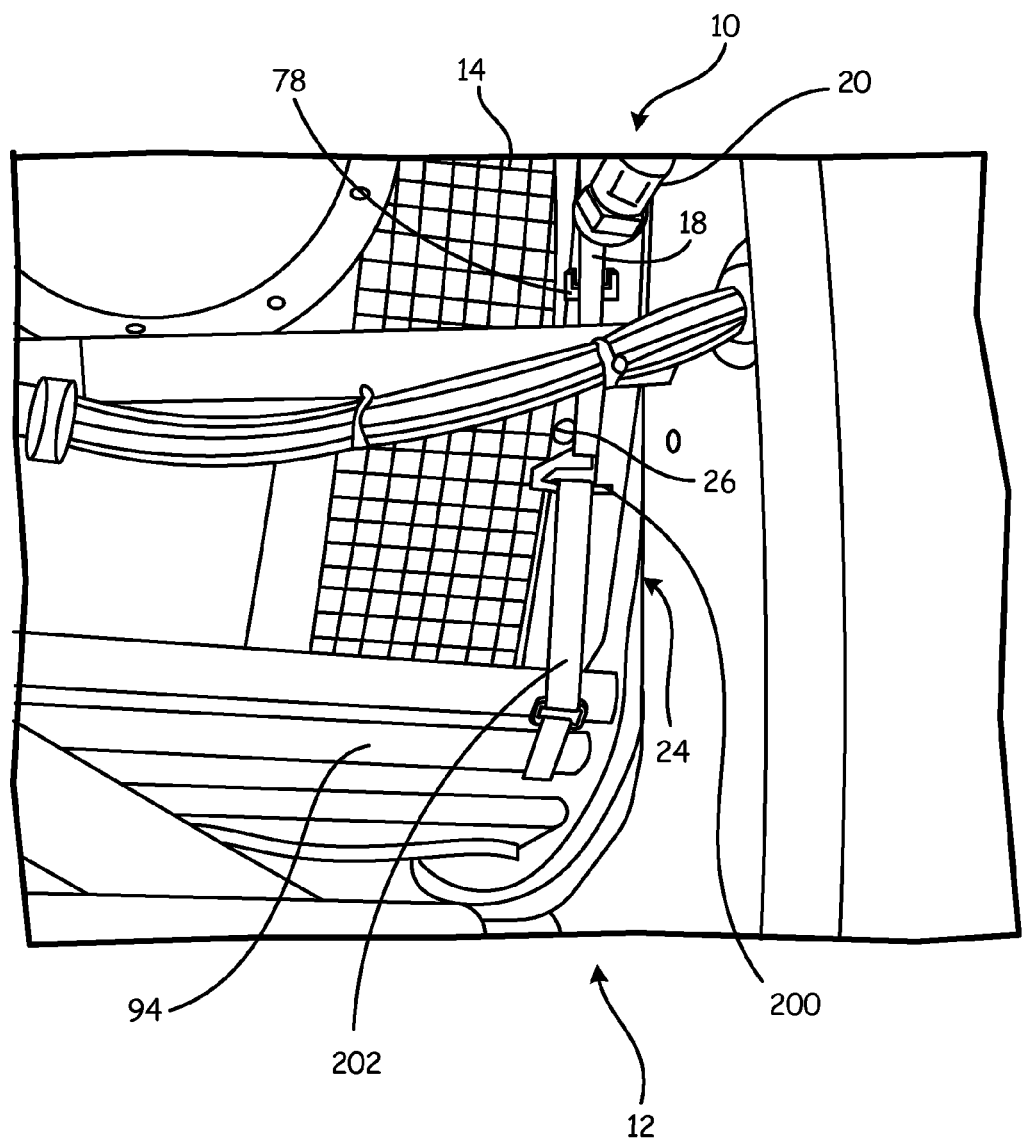
FIG. 9 is a perspective view of yet another embodiment of an engine wash manifold connected to a portion of an engine.

FIG. 9 shows a seventh embodiment of an engine wash manifold 10, configured to hold nozzles 26 in position to spray radially into engine 12. In this embodiment, feeder body 18 includes strap attachment members 200 at or near opposite ends that allow engagement with one or more suitable straps 202. As shown in FIG. 9, two straps 202 are provided, one for each of the strap attachment members 200 (only one strap attachment member 200 and strap 202 is visible in FIG. 9). Straps 202 can be looped or otherwise connected to parts of engine 12, such as tube 94, and cinched to provide a taut engagement between feeder body 18 and engine 12. Adjustment can be provided by a frictionally engaged adjustment loop, hook-and-loop material, clips, ratchets or winches, or any other suitable mechanism. In further embodiments, a single strap 202 could be engaged with both strap attachment members 200.

Reference to a PT6 engine 12 in the descriptions above is for example purposes only, and engine wash manifold 10 and can be used with other aircrafts and/or engines. The dimensions and shape of manifold 10 are for example purposes only and can vary according to engine requirements. The number and placement of nozzles 26a, 26b, 26c and 26d (collectively, nozzles 26) on manifold 10 can also vary according to engine architecture and requirements.

Appendix A includes additional figures illustrating various embodiments of the present invention.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like. Moreover, the term "engine" or "engine assembly" should be interpreted to include the engine itself and closely associated structures, such as engine mounting members and the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the entire disclosure. For instance, features and structures (e.g., wash fluid compositions, pressures, droplet sizes, etc.) disclosed with respect to one embodiment can be utilized with respect to another embodiment as desired and as suitable for particular applications.

The invention claimed is:

1. A method of washing an engine having a radial passageway, the method comprising:
   securing a manifold with one or more nozzles relative to the engine so that at least one of the one or more nozzles are oriented to spray into the radial passageway, wherein the step of securing a manifold with one or more nozzles relative to the engine comprises engaging one or more clamping devices and includes:
      squeezing a spring mounted clamping device;
      inserting tabs on the spring mounted clamping device into an inlet screen of the engine; and
      releasing the spring mounted clamping device so that the tabs engage the inlet screen radially and either axially or circumferentially;
   delivering wash fluid to an inlet on the manifold;
   flowing the wash fluid from the inlet through a feeder body of the manifold to the one or more nozzles; and
   directing the wash fluid through the one or more nozzles in a generally radial direction into the radial passageway.

2. The method of claim 1 and further comprising:
   squeezing the engaged spring mounted clamping device; and
   removing tabs on the spring mounted clamping device from the inlet screen of the engine.

3. The method of claim 1, wherein the step of directing the wash fluid through the one or more nozzles in a generally radial direction into the radial passageway atomizes the wash fluid.

4. An engine wash manifold assembly for delivering wash liquid to an engine with a radial air passage, the manifold assembly comprising:

a feeder body;

an inlet on the feeder body to receive wash fluid;

a first nozzle in fluid communication with the feeder body and configured to direct wash fluid in a radial direction such that the wash fluid can pass into the radial air passage, wherein the first nozzle is configured to atomize the wash fluid;

one or more additional nozzles in fluid communication with the feeder body and configured to spray the wash fluid radially, wherein the first nozzle and the one or more additional nozzles are convergent, such that the wash fluid from the first nozzle and the one or more additional nozzles converges inwardly toward a common axis; and a securing device configured to support the feeder body relative to a mounting location, wherein the securing device comprises a spring-loaded clamping mechanism that includes a first clamping member and a second clamping member pivotally secured to each other at a pivot location, wherein the first and second clamping members are compressible relative to the pivot location and expand relative to the pivot location as a function of a spring bias force.

5. The manifold assembly of claim 4, wherein the securing device is positioned in between the first nozzle and any of the one or more additional nozzles along the feeder body, and wherein the feed body is arcuate.

6. The manifold assembly of claim 4, wherein the spring-loaded clamping device is positioned in between the first nozzle and any of the one or more additional nozzles along the feeder body.

7. The manifold assembly of claim 4, wherein the feeder body is arcuate.

8. An engine wash manifold assembly for delivering wash liquid to an engine with a radial air passage, the manifold assembly comprising:

a feeder body;

an inlet on the feeder body to receive wash fluid;

a first nozzle in fluid communication with the feeder body and configured to direct wash fluid in a radial direction such that the wash fluid can pass into the radial air passage; and a spring-loaded clamping mechanism configured to support the feeder body relative to a mounting location, the spring-loaded clamping mechanism including a first clamping member and a second clamping member pivotally secured to each other at a pivot location, wherein the first and second clamping members are compressible relative to the pivot location and expand relative to the pivot location as a function of a spring bias force.

9. The manifold assembly of claim 8, and further comprising a centering feature.

10. The manifold assembly of claim 8, wherein the feeder body is an arcuate pipe, and wherein the arcuate pipe has a central angle of approximately 84°.

11. The manifold assembly of claim 8, wherein the first nozzle is configured to atomize the wash fluid.

12. The manifold assembly of claim 8, wherein the spring-loaded clamping mechanism is configured to selectively engage an inlet screen of the engine by insertion into one or more inlet screen openings.

13. The manifold assembly of claim 12, wherein the spring-loaded clamping device is configured to selectively engage a wire mesh inlet screen of the engine by insertion into one or more openings located between wires of the wire mesh inlet screen.

14. The manifold assembly of claim 8, wherein the feeder body is arcuate.

15. The manifold assembly of claim 14, wherein the feeder body has opposite ends and is continuously curved between the opposite ends.

16. The manifold assembly of claim 8, wherein the spring-loaded clamping mechanism further comprises:

tabs that protrude from the first clamping member at a location spaced from the pivot location.

17. The manifold assembly of claim 16, wherein at least one of the tabs protrudes axially.

18. The manifold assembly of claim 16, wherein at least one of the tabs protrudes circumferentially.

19. The manifold assembly of claim 8, and further comprising:

an additional nozzle in fluid communication with the feeder body and configured to spray the wash fluid radially.

20. The manifold assembly of claim 19, wherein the spring-loaded clamping mechanism is positioned in between the first nozzle and the additional nozzle along the feeder body.

21. The manifold assembly of claim 19, wherein the additional nozzle is configured to atomize the wash fluid.

* * * * *